United States Patent [19]

Wilson et al.

[11] Patent Number: 4,761,886
[45] Date of Patent: Aug. 9, 1988

[54] DIPSTICK FOR MEASURING OIL OR FLUID LEVELS

[75] Inventors: David J. Wilson, Deeping St. James; David Elmore, Bourne, both of United Kingdom

[73] Assignee: Perkins Engines Group Limited, London, United Kingdom

[21] Appl. No.: 32,794

[22] Filed: Mar. 31, 1987

[30] Foreign Application Priority Data

Apr. 1, 1986 [GB] United Kingdom ............... 8607980

[51] Int. Cl.$^4$ ........................................... G01F 23/04
[52] U.S. Cl. ............................................... 33/126.7 R
[58] Field of Search .................. 33/126.7 R, 126.7 A, 33/126.4, 126; 403/372, 345, 367, 904, 397

[56] References Cited

U.S. PATENT DOCUMENTS

| 2,443,294 | 6/1948 | Bickle | 33/126.7 R |
| 3,474,884 | 10/1969 | Braun | 33/126.7 R X |
| 3,991,476 | 11/1976 | Haines | 33/126.7 R |

FOREIGN PATENT DOCUMENTS 1380210 11/1975 United Kingdom ........... 33/126.7 R

Primary Examiner—William D. Martin, Jr.

[57] ABSTRACT

A dipstick comprises a blade (1) having a handle (4) connected to one end of the blade by means of an intermediate resilient tubular collar (3), said one end of the blade and said collar being provided with first formations (10,11) that cooperate as a snap-fit when said one end of the blade is inserted into the collar thereby to retain the two axially together, and said handle having a central aperture (5) to receive the collar as a close fit and said handle and said collar being provided with second formations (16,18) that cooperate as a snap-fit when said collar is inserted into the central aperture in the handle thereby to retain the two axially together, said first formations (10,11) then being constrained radially within said aperture (5) so as to lock the blade therein. Thus, the blade and collar can be easily assembled together and both then inserted into the handle to form the complete assembly in a simple manner. Preferably, the handle and collar are composed of plastics material and the blade is either metal or plastics depending upon the particular application. Said first formations may comprise a pair of notches (10) in the blade and a cooperating projection (11) on the inner surface of the collar. Said second formations may comprise a pair of lugs (16), provided on an end of the collar that project from said central aperture and cooperate with a shoulder. An axial slit divides said projecting end of the collar into two in a plane perpendicular to the blade and extends as far as the notches in the blade.

8 Claims, 2 Drawing Sheets

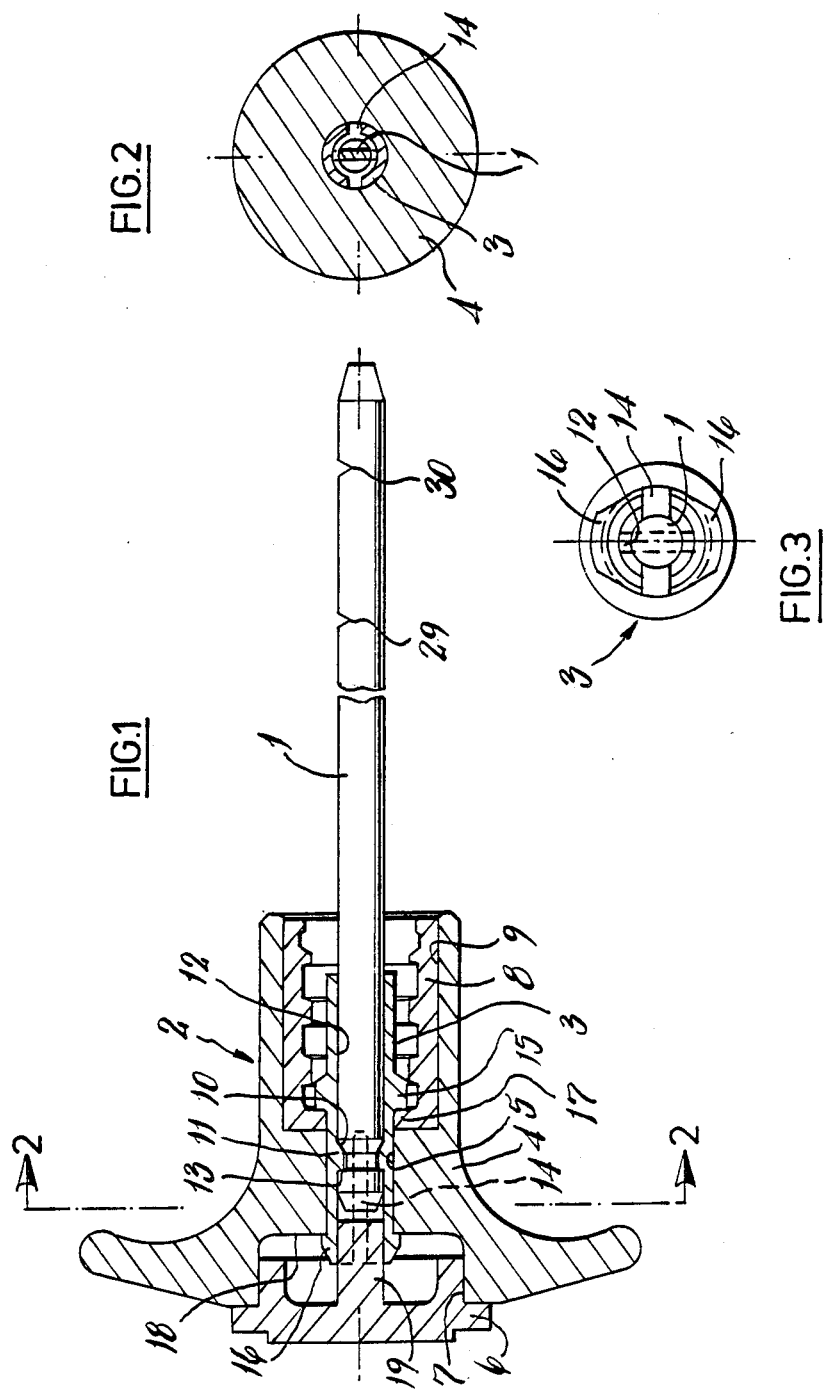

DIPSTICK FOR MEASURING OIL OR FLUID LEVELS

TECHNICAL FIELD

This invention relates to a dipstick suitable for measuring oil or fluid levels in the sumps of engines.

Most commonly, dipsticks are made from a length of metal wire part of which forms a blade and part of which is bent to form a handle. A collar, usually made of metal and sometimes carrying a washer is fixed on the wire between the blade and handle and serves as a stop to abut against and close the top of a tube through which the blade is inserted into the sump.

Dipsticks have also been formed as one-piece plastic mouldings or with plastic handles moulded onto a metal blade so as to reduce the cost of production. However, the choice of plastics material used is critical if it is to meet the requirements for heat and oil resistance and also blade flexibility.

DISCLOSURE OF THE INVENTION

An object of the present invention is to provide a dipstick as a simple assembly that can be easily assembled at low cost and allows the use of plastics material.

A dipstick according to the invention comprises a blade having a handle connected to one end of the blade by means of an intermediate resilient tubular collar, said one end of the blade and said collar being provided with first formations that cooperate as a snap-fit when said one end of the blade is inserted into the collar thereby to retain the two axially together, and said handle having a central aperture to receive the collar as a close fit and said handle and said collar being provided with second formations that cooperate as a snap-fit when said collar is inserted into the central aperture in the handle thereby to retain the two axially together, said first formations then being constrained radially within said aperture so as to lock the blade therein. Thus, the blade and collar can be easily assembled together and both then inserted into the handle to form the complete assembly in a simple manner. Preferably, the handle and collar are composed of plastics material and the blade is either metal or plastics depending upon the particular application.

Preferably, said first formations comprise a pair of notches in the blade and cooperating projections on the inner surface of the collar. When assembled on the blade, the collar projects beyond said one end of the blade. External lugs are provided on this projecting end of the collar and cooperate with a shoulder at the end of said central aperture to serve as said second formations. An axial slit divides said projecting end of the collar into two in a plane perpendicular to the blade and extends as far as the notches in the blade so as to facilitate insertion of the blade into the collar past said internal projection before it engages the notches. This slit also facilitates insertion of the collar through said central aperture, the external lugs being compressed within the aperture before emerging to engage said shoulder.

DESCRIPTION OF THE DRAWINGS

The invention will now be described by way of example with reference to the accompanying drawings in which:

FIG. 1 is an axial section through a dipstick according to the invention,

FIG. 2 is a cross-section through 2—2 in FIG. 1,

FIG. 3 is an axial end view of the collar in FIG. 1, and

BEST MODE OF CARRYING OUT THE INVENTION

Figure 4:
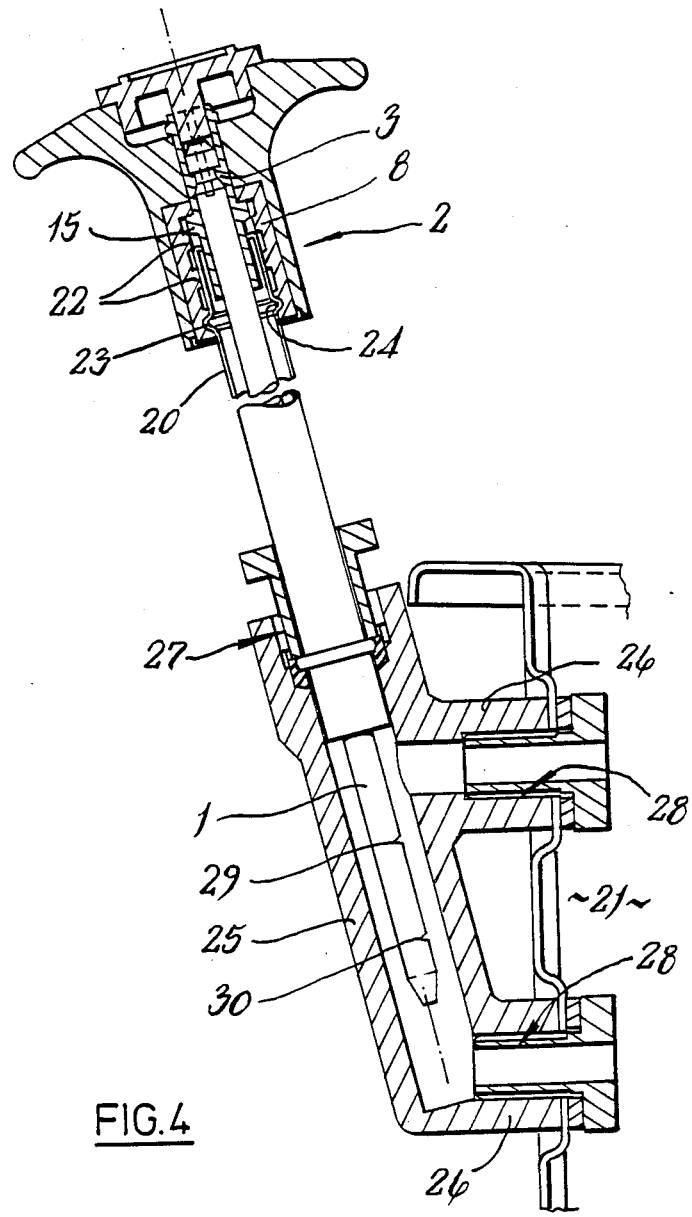
FIG. 4 is a section through part of an engine sump fitted with the dipstick of FIG. 1.

The illustrated dipstick comprises a flat metal blade 1 with a handle assembly 2 connected to it at one end. The handle comprises a tubular collar 3 composed of a resilient plastics material with a rectangular-section central aperture 12 to receive said one end of the blade 1, a rigid moulded plastics handle 4 formed with a central aperture 5 to receive the collar 3, a rigid moulded plastics cap 6 that closes a recess 7 in the top of the handle, and an annular seal 8 that is received in a recess 9 in the bottom of the handle around the dipstick.

The end of the blade 1 that cooperates with the collar 3 is formed with a pair of notches 10 opposite one another in the edges of the blade, and the short sides of the aperture 12 in the collar 3 are formed with a pair of opposed inwardly directed projections 11 with a similar cross-section to the notches 10 so as to engage therein with abutting right-angled shoulders 13 to restrain withdrawal of the blade once inserted. To facilitate the insertion of the end of the blade past the projections 11, the end of the collar furthermost from the blade is split axially by a slit 14 that extends as far as the projections 11 in a plane perpendicular to the plane of the blade 1 so that when inserted, the end of the blade engages the projections 11 and moves the split halves of the collar apart. When assembled, the split end of the collar projects beyond the end of the blade.

The collar 3 is formed with an external shoulder 15 at an intermediate part of its length to abut a flange 17 at one end of the seal 8 when the latter is fitted over the split end of the collar. The seal 8 then projects downwards around the lower end of the collar and adjacent portion of the dipstick. The split end of the collar is then inserted into the central aperture 5 in the handle until the seal 8 is fully inserted into the recess 9 in the handle. The split end of the collar then projects from the aperture 5 into the recess 7 in the top of the handle, and a pair of external lugs 16 on opposite halves of the split ends engage the floor 18 of the recess to retain the handle in place on the collar. As shown in FIG. 3, the two lugs 16 on the end of the collar have a substantially oval outline divided by the slit 14. Thus, the two lugs 16 can close together to pass through the central aperture 5, and are moved apart by their natural resilience once they emerge into the recess 7. The cap 6 is a press fit in the recess 7 and is formed with a central stub 19 that engages in the open split end of the collar and holds the two halves apart, thereby locking the lugs 16 in the recess so that the handle assembly 2 cannot come free from the blade 1.

When in use as in FIG. 4, the dipstick is inserted into a tube 20 that communicates with the sump 21. The lower end of the collar 3 engages inside the tube 20 and ribs 22 on the inner surface of the seal 8 engage the outer surface of the tube 20 to form a seal. When fully inserted, the top of the tube 20 abuts the underside of the shoulder 15, and a bead 23 on the outer surface of the tube engages a groove 24 in the inner surface of the seal to retain the dipstick in place.

The tube 20 is connected to a vertical oil level pipe 25 mounted on the side wall of the sump 21 through two horizontal branch pipes 26. The pipes 25, 26 are formed as a die-casting and the tube 20 is connected to the pipe 25 through a screw connection 27, and the pipes 26 are connected to the sump 21 through respective screw connections 28.

A pair of notches 29, 30 in the edge of the blade 1 at its lower end define maximum and mimimum oil level marks.

The blade 1 may be a metal blade or a blade composed of plastics material.

In an alternative embodiment, the stub 19 on the cap 6 may be omitted if the lugs 16 engage the floor 18 securely enough.

We claim:

1. A dipstick comprising a blade having a handle connected to one end of the blade by means of an intermediate resilient tubular collar, and a cap that engages a recess in the handle and cooperates with the collar; said one end of the blade and said collar being provided with formations that cooperate as a snap-fit when said one end of the blade is inserted into the collar thereby to retain the two axially together; said handle having a central aperture to receive the collar as a close fit and said handle and said collar being provided with second formations that cooperate as a snap-fit when said collar is inserted into the central aperture in the handle thereby to retain the two axially together, said first formations then being constrained radially within said aperture so as to lock the blade therein; and said cap engaging an adjacent end of the collar axially to constrain said second formations radially thereby to lock the collar to the handle.

2. A dipstick as claimed in claim 1 in which said first formations comprise a notch in the side of the blade and a cooperating projection on the inner surface of the collar.

3. A dipstick as claimed in claim 2 in which said second formations comprise an external lug on the collar at that end inserted through said central aperture of the handle so that said lug engages a shoulder at the end of the aperture to retain the collar and handle together axially.

4. A dipstick as claimed in claim 3 in which the end of the collar carrying said lug is split into two halves by an axially extending slit and a similar lug is provided on each.

5. A dipstick as claimed in claim 4 in which said slit extends axially as far as said projection of said first formations.

6. A dipstick as claimed in claim 5 in which the blade is flat and is arranged substantially transversely of the plane of said slit.

7. A dipstick as claimed in claim 4 in which the end of the collar carrying the lug projects into said recess in the handle which is closed by said cap.

8. A dipstick as claimed in claim 7 in which a stub on the cap engaages the open slit end of the collar to hold the lug in engagement with said shoulder.

* * * * *